US012736488B2

(12) United States Patent
Ahn et al.

(10) Patent No.: US 12,736,488 B2
(45) Date of Patent: Sep. 15, 2026

(54) WAFER MEASUREMENT APPARATUS AND OPERATING METHOD THEREOF

(71) Applicant: SAMSUNG ELECTRONICS CO., LTD., Suwon-si (KR)

(72) Inventors: Jaehyung Ahn, Suwon-si (KR); Inseok Park, Suwon-si (KR); Joonseo Song, Suwon-si (KR); Souk Kim, Suwon-si (KR); Younghoon Sohn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 417 days.

(21) Appl. No.: 18/458,565

(22) Filed: Aug. 30, 2023

(65) Prior Publication Data

US 2024/0248051 A1 Jul. 25, 2024

(30) Foreign Application Priority Data

Jan. 20, 2023 (KR) ........................ 10-2023-0008859

(51) Int. Cl.

*G01N 23/2251* (2018.01)
*G06T 7/00* (2017.01)
*G06T 7/80* (2017.01)

(52) U.S. Cl.

CPC ....... *G01N 23/2251* (2013.01); *G06T 7/0004* (2013.01); *G06T 7/80* (2017.01); *G01N 2223/303* (2013.01); *G01N 2223/401* (2013.01); *G01N 2223/6116* (2013.01); *G06T 2207/10061* (2013.01); *G06T 2207/30148* (2013.01)

(58) Field of Classification Search

CPC ......... G01N 23/2251; G01N 2223/303; G01N 2223/401; G01N 2223/6116; G06T 7/80; G06T 7/004; G06T 2207/10061; G06T 2207/30148

See application file for complete search history.

(56) References Cited

U.S. PATENT DOCUMENTS

| | | | | |
|---|---|---|---|---|
| 7,399,964 | B2 | 7/2008 | Shishido et al. | |
| 7,660,687 | B1 * | 2/2010 | De | G01R 31/307 250/306 |
| 8,362,426 | B2 | 1/2013 | Kobaru et al. | |
| 9,053,904 | B2 | 6/2015 | Ishii et al. | |
| 10,141,159 | B2 | 11/2018 | Doi et al. | |
| 2004/0061054 | A1 | 4/2004 | Kondo et al. | |

(Continued)

FOREIGN PATENT DOCUMENTS

| | | | |
|---|---|---|---|
| EP | 4009349 A1 * | 6/2022 | H01J 37/304 |
| JP | 4865271 | 2/2012 | |

(Continued)

*Primary Examiner* — Georgia Y Epps
*Assistant Examiner* — Hanway Chang
(74) *Attorney, Agent, or Firm* — Morgan, Lewis & Bockius LLP

(57) ABSTRACT

A wafer measurement apparatus includes an electronic-optical system configured to irradiate a wafer with an electron beam and acquire a raw signal by detecting electrons emitted by the wafer, and an image processing device configured to convert the raw signal acquired by the electronic-optical system into image data. The electronic-optical system includes a detector configured to acquire the raw signal. The detector calibrates a gain offset using a difference in electron emission yields of different materials.

20 Claims, 10 Drawing Sheets

(56) References Cited

U.S. PATENT DOCUMENTS

| | | | | |
|---|---|---|---|---|
| 2016/0189369 | A1 | 6/2016 | Jung et al. | |
| 2021/0134556 | A1 | 5/2021 | Ma | |
| 2022/0051868 | A1 | 2/2022 | Hamada et al. | |
| 2022/0319206 | A1 * | 10/2022 | Kocár | G06V 10/267 |

FOREIGN PATENT DOCUMENTS

| | | | | |
|---|---|---|---|---|
| KR | 10-2003-0085115 | | 11/2003 | |
| KR | 10-1321049 | | 10/2013 | |
| WO | WO-2022023304 | A1 * | 2/2022 | H01J 37/228 |

* cited by examiner

WAFER MEASUREMENT APPARATUS AND OPERATING METHOD THEREOF

CROSS-REFERENCE TO RELATED APPLICATION(S)

This application claims priority under 35 U.S.C. § 119 to Korean Patent Application No. 10-2023-0008859, filed on Jan. 20, 2023 in the Korean Intellectual Property Office, the disclosure of which is incorporated by reference herein in its entirety.

TECHNICAL FIELD

Embodiments of the present disclosure relate to a wafer measurement apparatus and an operating method thereof.

DISCUSSION OF RELATED ART

In general, a vertical memory element such as a VNAND has been developed due to a decrease in design rules of a semiconductor product. The vertical memory element may include contact structures having a high aspect ratio. Therefore, an inspection technique that monitors contact defects of a pattern with a high aspect ratio in real time may be utilized. Furthermore, for a faster inspection speed, Die-to-DB defect detection may be utilized to provide an accurate inspection method using an image processing technique.

SUMMARY

An aspect of the present disclosure is to provide a wafer measurement apparatus for measuring a wafer more precisely, and an operating method thereof.

According to an aspect of the present disclosure, a wafer measurement apparatus includes an electronic-optical system configured to irradiate a wafer with an electron beam and acquire a raw signal by detecting electrons emitted by the wafer, and an image processing device configured to convert the raw signal from the electronic-optical system into image data. The electronic-optical system includes a detector configured to acquire the raw signal. The detector calibrates a gain offset using a difference in electron emission yields of different materials.

According to an aspect of the present disclosure, an operating method of a wafer measurement apparatus includes loading a wafer onto a stage, moving an electron beam to a test sample having a plurality of materials, controlling a gain offset of a detector using a gray level of a test detection signal emitted by the test sample, after controlling the gain offset of the detector, moving the electron beam to an image acquisition position, and acquiring an image using a detection signal emitted at the image acquisition position.

According to an aspect of the present disclosure, an operating method of a wafer measurement apparatus includes acquiring a sample signal emitted by a test sample, determining whether detection calibration of a detector is to be performed using the sample signal, when the detection calibration is to be performed, adjusting a gain offset of the detector, when the detection calibration is not to be performed, post-calibrating a gray level of a raw signal acquired at a predetermined position of a wafer, and converting the calibrated gray level to an 8-bit image for the raw signal.

According to example embodiments of the present disclosure, a wafer measurement apparatus and an operating method thereof may measure a wafer more accurately by acquiring a raw signal after calibrating a gain offset of a detector using a test sample.

BRIEF DESCRIPTION OF DRAWINGS

The above and other features of the present disclosure will become more apparent by describing in detail embodiments thereof with reference to the accompanying drawings, in which.

DETAILED DESCRIPTION

Figure 1:
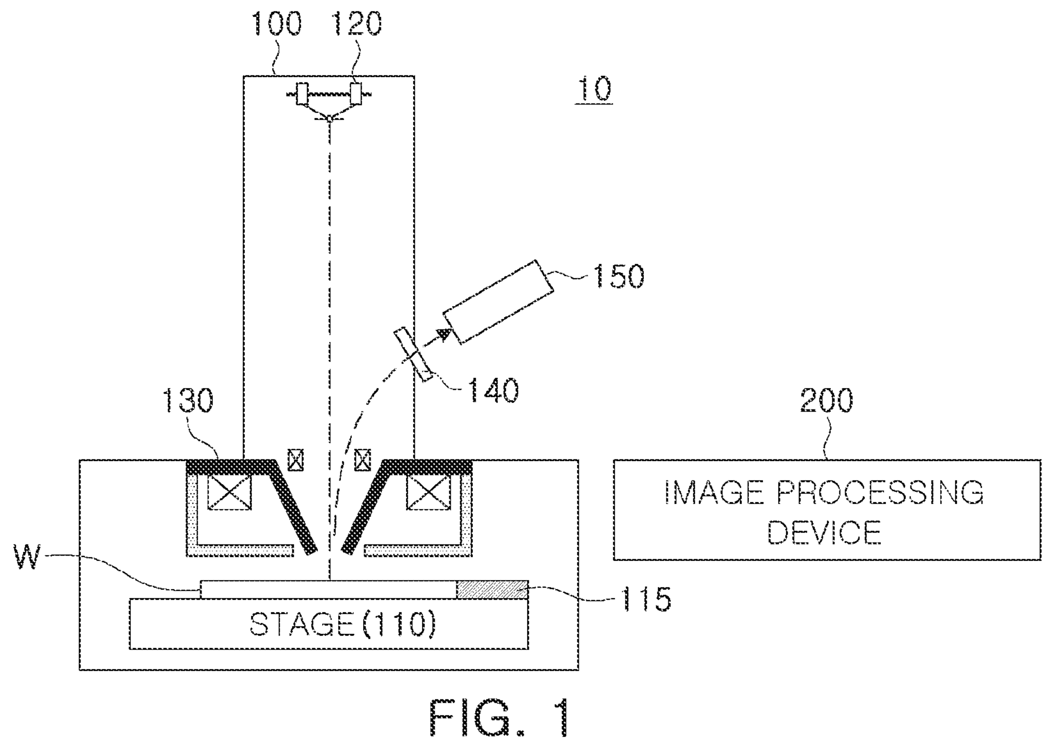
FIG. 1 is a view exemplarily illustrating a wafer measurement apparatus according to an example embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

In general, optical critical dimension (OCD) technology is used for non-destructive depth monitoring. However, since OCD technology performs average measurements over a large area, it may be difficult to measure the depth of individual elements. As a result, scanning electron microscopy (SEM) technology is being introduced to detect very fine defects in wafers. The SEM is a device that injects an electron beam onto a semiconductor sample's surface and observes the sample using, for example, secondary electrons, backscattered electrons, X-rays, and Auger electrons generated by interactions between the sample and the electron beam.

According to an embodiment of the present disclosure, a wafer measurement device and an operating method thereof may measure depth by quantifying the brightness generated in the SEM, utilizing the brightness change of the SEM. The wafer measurement device and the operating method may convert a specific raw signal into an acquired image to manage the detector's raw signal, and use the converted image as data. Additionally, the wafer measurement device and the operating method may calibrate the detector's gain offset by placing samples with different materials within the equipment, and utilizing the difference in electron emission yields of the corresponding samples. Here, the electron emission yield refers to the ratio of electrons acquired by the detector (e.g., the current value acquired by the detector) compared to electrons of the electron beam (e.g., the current value corresponding to the electron beam). Moreover, the wafer measurement device and the operating method may maintain consistency between equipment using an absolute brightness value for each material. As a result, even as the size of semiconductor devices becomes smaller, improved wafer inspection and measurement may be implemented according to embodiments of the present disclosure.

FIG. 1 is a view exemplarily illustrating a wafer measurement apparatus 10 according to an example embodiment of the present disclosure.

Referring to FIG. 1, the wafer measurement apparatus 10 may include an electronic-optical system 100 and an image processing device 200. In an example embodiment, the wafer measurement apparatus 10 may be implemented to detect defects in a pattern formed on a wafer W in a non-destructive manner, in a semiconductor manufacturing process for manufacturing semiconductor elements such as a DRAM and a VNAND. The wafer measurement apparatus 10 may perform in-line process monitoring of a semiconductor process performed on the wafer W.

The electronic-optical system 100 may be implemented to acquire a real image of a pattern by irradiating a wafer W on which the pattern is formed with an electron beam and detecting emitted electrons. The electronic-optical system 100 may include a stage 110, a test sample 115, an electron gun 120, a lens system 130, an energy filter 140, and a detector 150.

The stage 110 may be implemented to support the wafer W. In an example embodiment, the wafer W may be a semiconductor wafer having a multilayer structure formed thereon. The wafer W may refer to a substrate formed of a semiconductor material or a non-semiconductor material. The wafer W may include a plurality of layers formed on the substrate. Each of the plurality of layers may include, for example, a photoresist, a dielectric material, and a conductive material. However, the present disclosure is not limited thereto.

The test sample 115 may include different materials for SEM image compensation for each tool or equipment. Here, the materials have a difference in different electron emission yields. A gain or offset of a detection signal acquired by the detector 150 may be calibrated based on the difference in the electron emission yields.

The electron gun 120 may be implemented to generate an electron beam. The electron gun 120 may be implemented by an electron microscope. For example, the electron gun 120 may be a scanning electron microscopy (SEM). In an example embodiment, an electron microscope may be implemented as a high-resolution scanning electron microscope (HRSEM) that emits an electron beam having a high acceleration voltage. The electron gun 120 of the electronic-optical system 100 may irradiate the wafer W with the electron beam. In an example embodiment, a depth at which the electron beam penetrates into the wafer W may be adjusted by adjusting an acceleration voltage of the electron beam. For example, the electron gun 120 may generate an electron beam having an acceleration voltage of about 10 kV or more. With an increase in the acceleration voltage of the electron beam, the depth at which the electron beam penetrates into the wafer W increases. Accordingly, as the number of electrons emitted from the lower layer of the wafer W increases, electrons with less structural information may be detected. When the wafer W is irradiated with the electron beam, for example, secondary electrons, backscattered electrons, and Auger electrons may be emitted by the wafer W.

The lens system 130 may be implemented to control a direction and a width of the electron beam and irradiate the wafer W with the electron beam.

The energy filter 140 may be implemented to filter electrons emitted by the wafer W. The energy filter 140 may include, for example, a splitter that acquires a detection signal for each energy band.

The detector 150 may be implemented to detect a signal emitted by the wafer W via the energy filter 140. In an example embodiment, the detector 150 may mainly detect the secondary electrons and the backscattered electrons. An SEM image of the surface of the wafer W may be acquired from the detected electrons. Here, the SEM image may be a spatial image having 2D spatial information. That is, the SEM image may represent a structure of a multilayer film structure on the wafer W. Furthermore, the detector 150 may generate a real image representing a structure of a hole pattern such as a contact hole with a high aspect ratio.

Furthermore, the detector 150 may be implemented to receive gray levels generated through the test sample 115 having various materials, and calibrate a gray level of a raw signal between the tools using the gray levels corresponding to the received test sample.

The image processing device 200 may be connected to the electronic-optical system 100 in a wired or wireless manner, and may be implemented to detect a defect pattern of the wafer by detecting a pattern through a received image signal or comparing a design image of the pattern with an actual image. Furthermore, the image processing device 200 may more precisely calibrate the gray level calibrated by the detector 150.

Typically, wafer measurement devices according to a comparative example do not directly use the raw signal of SEM, instead utilizing an 8-bit converted image for Critical Dimension (CD) measurement or inspection. These wafer measurement devices according to a comparative example cannot directly use the signal due to the lack of management of the raw signal. Consequently, there is insufficient management of the raw signal between equipment before and after Preventive Maintenance (PM) or between different equipment according to the comparative example. Ensuring data stability may be challenging due to the variability of the detector's gain depending on the sample's condition or process.

On the other hand, the wafer measurement apparatus 10 according to an embodiment of the present disclosure may achieve consistent gray levels of the raw signal between equipment using well-known material electron emission yields. The wafer measurement apparatus 10 may fabricate a test sample using electron emission yields with material-dependent differences, and calibrate the detector 150 based on the gray level value of the detection signal generated by the test sample. This allows for improved gray levels of detection signals through material-specific calibration. Additionally, the wafer measurement apparatus 10 may overcome differences arising from raw signal measurements between equipment by more precisely calibrating the improved gray level in the image processing device 200.

Figure 2:
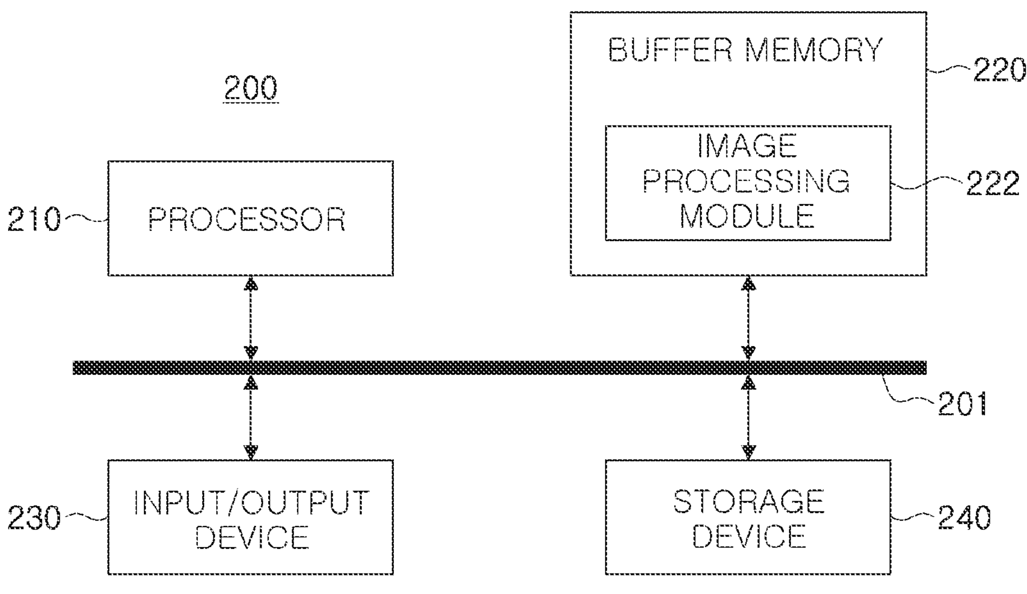
FIG. 2 is a block diagram illustrating an image processing device according to an example embodiment of the present disclosure.

FIG. 2 is a block diagram illustrating an image processing device 200 according to an example embodiment of the present disclosure.

Referring to FIG. 2, the image processing device 200 may include at least one processor 210 connected to a system bus 201, a memory device 220 (e.g., a buffer memory), an input/output device 230, and a storage device 240.

The image processing device 200 may be provided as a dedicated device for wafer measurement. The image processing device 200 may include various measurement simulation programs. The processor 210, the memory device 220, the input/output device 230, and the storage device 240 may be electrically connected and may exchange data with each other through the system bus 201. The configuration of the system bus 201 is not limited to the aforementioned description, and may further include mediation means for efficient management.

At least one processor 210 may be implemented to control an overall operation of the image processing device 200. The processor 210 may be implemented to execute at least one instruction. For example, the processor 210 may be implemented to execute software (e.g., application programs, operating systems, device drivers) to be performed in the image processing device 200. The processor 210 may execute the operating system loaded in the memory device 220. The processor 210 may execute various application programs to be driven based on the operating system basis. For example, the processor 210 may drive a PPC tool and a PRC tool read from the memory device 220. In an example embodiment, the processor 210 may be, for example, a central processing unit (CPU), a microprocessor, an application processor (AP), or any processing device similar thereto.

The memory device 220 may be implemented to store at least one instruction. For example, the operating system or the application programs may be loaded in the memory device 220. Upon booting the image processing device 200, an OS image stored in the storage device 240 may be loaded in the memory device 220 according to a booting sequence. Various input/output operations of the image processing device 200 may be supported by the operating system. Similarly, the application programs may be loaded in the memory device 220 so that they are selected by a user or a basic service is provided. For example, an image processing module 222 which may improve the gray level of the raw signal received from the detector or verify wafer defects may be loaded from the storage device 240 to the memory device 220.

Furthermore, the memory device 220 may be a volatile memory such as, for example, a dynamic random access memory (DRAM) and a static random access memory (SRAM), or may be a volatile memory such as, for example, a flash memory, a phase change random access memory (PRAM), a resistance random access memory (RRAM), a nano floating gate memory (NFGM), a polymer random access memory (PoRAM), a magnetic random access memory (MRAM), and a ferroelectric random access memory (FRAM).

The input/output device 230 may be implemented to control a user input and output from a user interface device. For example, the input/output device 230 may be equipped with input means such as a keyboard, a keypad, a mouse, and a touch screen, and may receive information from the user.

The storage device 240 may be provided as a storage medium of the image processing device 200. The storage device 240 may store, for example, application programs, an OS image, and various data. The storage device 240 may be provided in the form of a mass storage device such as, for example, a memory card (e.g., MMC, eMMC, SD, or Micro SD), a hard disk drive (HDD), a solid state drive (SSD), or a universal flash storage (UFS).

Figure 3:
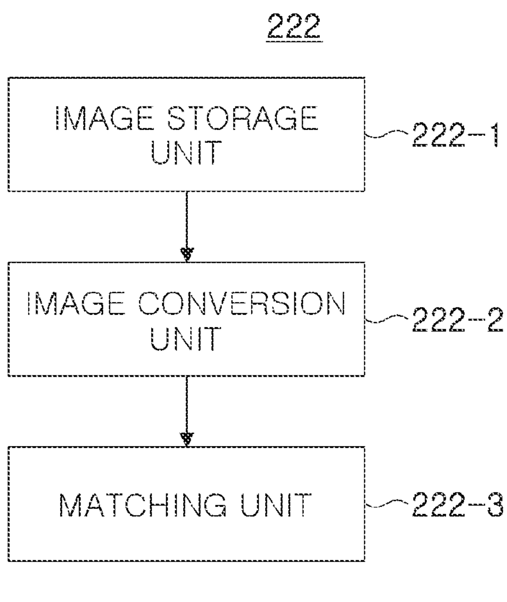
FIG. 3 is a view exemplarily illustrating an image processing module illustrated in FIG. 2 according to an example embodiment of the present disclosure.

FIG. 3 is a view exemplarily illustrating the image processing module 222 illustrated in FIG. 2 according to an example embodiment.

Referring to FIG. 3, the image processing module 222 may include an image storage unit 222-1, an image conversion unit 222-2, and a matching unit 222-3.

The image storage unit 222-1 may be implemented to receive and store the SEM image from the detector 150 (see FIG. 1). Furthermore, the image storage unit 222-1 may store a design image for a pattern of the wafer W. Here, the design image may be a data image used to determine a layout of the pattern. For example, the design image may include a graphic data system (GDS) image which is a storage format of the layout.

The image conversion unit 222-2 may generate a conversion image by performing contrast conversion based on a pixel-specific gray level of the SEM image, acquiring a conversion image representing only a normal pattern, and compensating the acquired image. For example, the image conversion unit 222-2 may convert a pixel value below a set gray level of the SEM image to 0 and adjust the brightness or Gaussian blur of the conversion image.

The image conversion unit 222-2 may generate the conversion image by selecting only a specific gray level distribution from the SEM image and separating and removing pixels in the remaining gray level range. For example, the image conversion unit 222-2 may perform the contrast conversion of the SEM image so that all values below the gray level (e.g., a threshold) set in the SEM image with a gray level range of 0 to 255 are designated as zero (0), and values exceeding the threshold remain unchanged. As pixels with a gray level below the threshold are defined as pixels representing defects and removed, the conversion image represents only a normal pattern. Here, the threshold may be selected considering, for example, the thickness of the pattern, the materials of the pattern, and the amount of detected electrons. Furthermore, the image conversion unit 222-2 may generate a calibration image by significantly changing an image of a reduced pattern and filtering the altered image. For example, the image conversion unit 222-2 may compensate for the conversion image by adjusting the brightness or applying Gaussian blur to the conversion image.

The matching unit 222-3 may detect the defect pattern by matching the calibrated conversion image with the design image of the pattern. For example, the calibrated conversion image and the design image may be matched with each other using methods such as image edge matching and image contrast matching.

The electronic-optical system 100 illustrated in FIG. 1 may include samples of various materials in tools to identically match the raw signals output from the detector 150. The electronic-optical system 100 may adjust a gain offset value of the detector 150 so that the brightness generated from each material are made identical. The value for each fine material that is not calibrated even after adjusting the gain offset value of the electronic-optical system 100 may be calibrated to be the same value through a table when converting an image in the image processing module 222.

The image processing module 222 may be connected to an output unit. Images and detection result values from the image processing module 222 may be transmitted to the output unit. The output unit may output the detection result values on the display device.

Figure 4A:
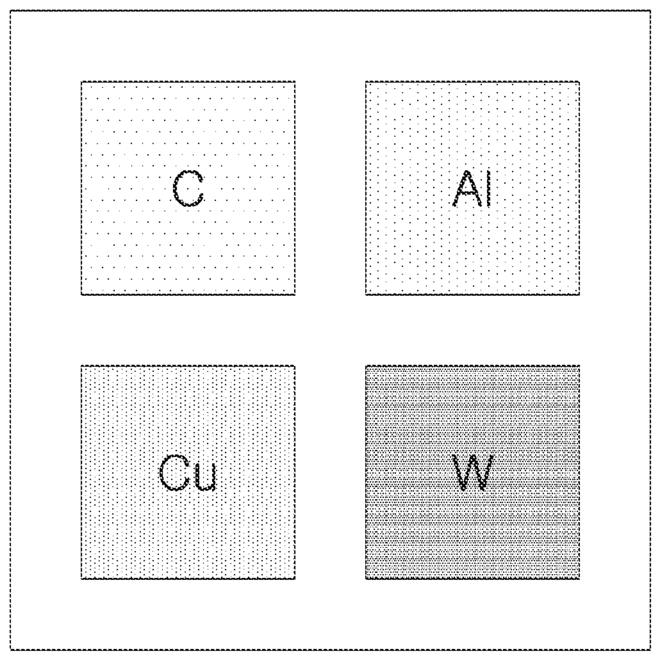
FIGS. 4A, 4B, and 4C are views exemplarily illustrating a test sample, an electron energy distribution for the test sample, and a detection gray level according to an example embodiment of the present disclosure.
Figure 4B:
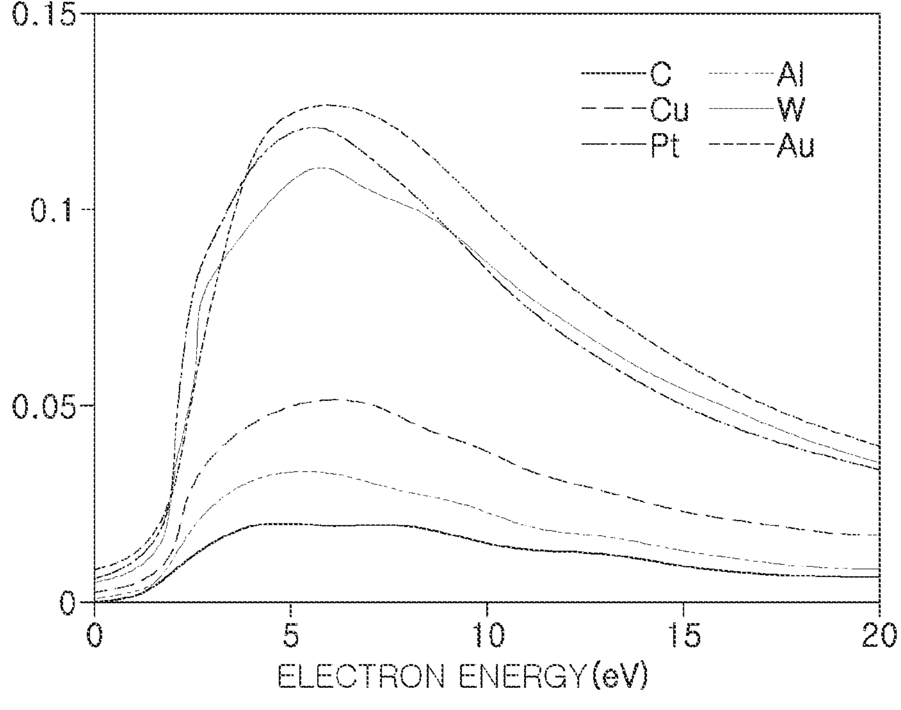
Figure 4C:
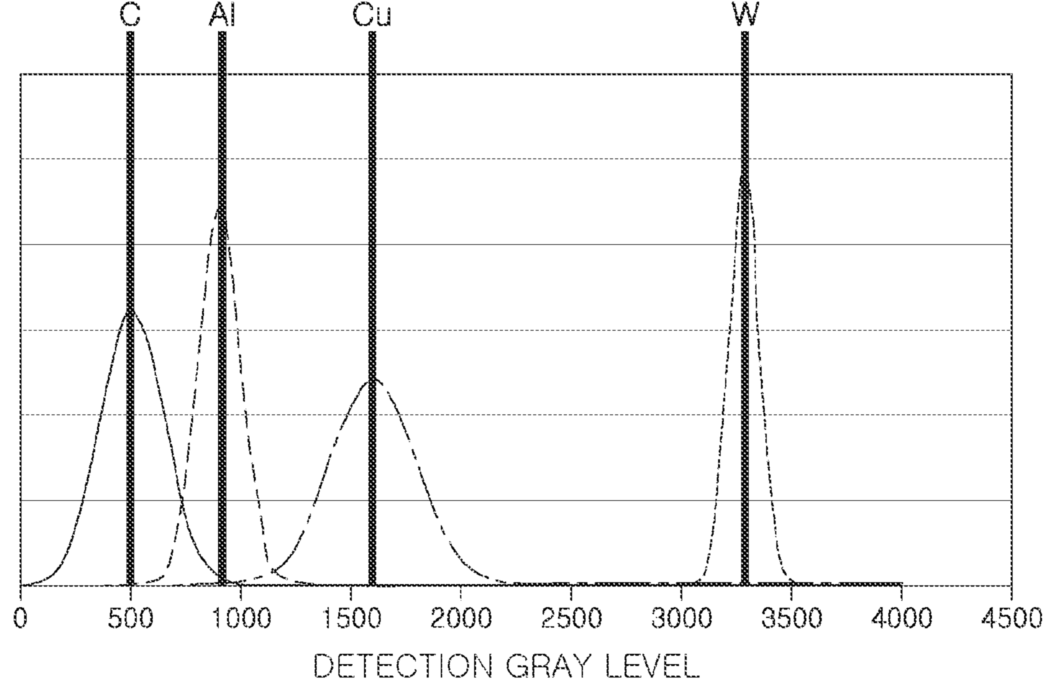

FIGS. 4A, 4B, and 4C are views exemplarily illustrating a test sample 115, an electron energy distribution for the test sample 115, and a detection gray level according to an example embodiment of the present disclosure.

Referring to FIG. 4A, the test sample 115 may include, for example, carbon (C), aluminum (Al), copper (Cu), and tungsten (W). However, the materials included in the test sample are not limited thereto. Referring to FIG. 4B, electron energy distributions for various materials included in the test sample 115 are different from each other. Accordingly, as illustrated in FIG. 4C, distribution of detection gray levels are different from each other.

Figure 5A:
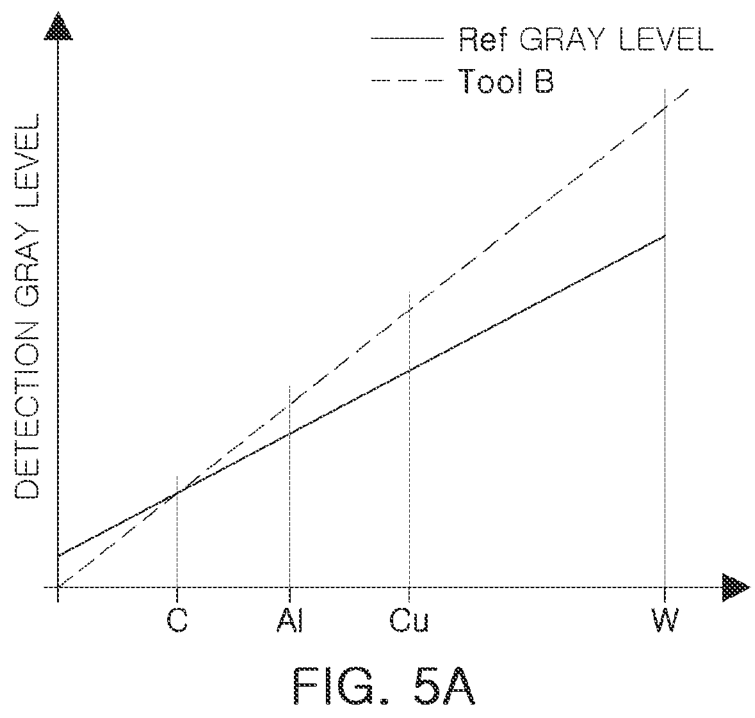
FIGS. 5A and 5B are views exemplarily illustrating states before and after calibrating a gray level according to an example embodiment of the present disclosure.
Figure 5B:
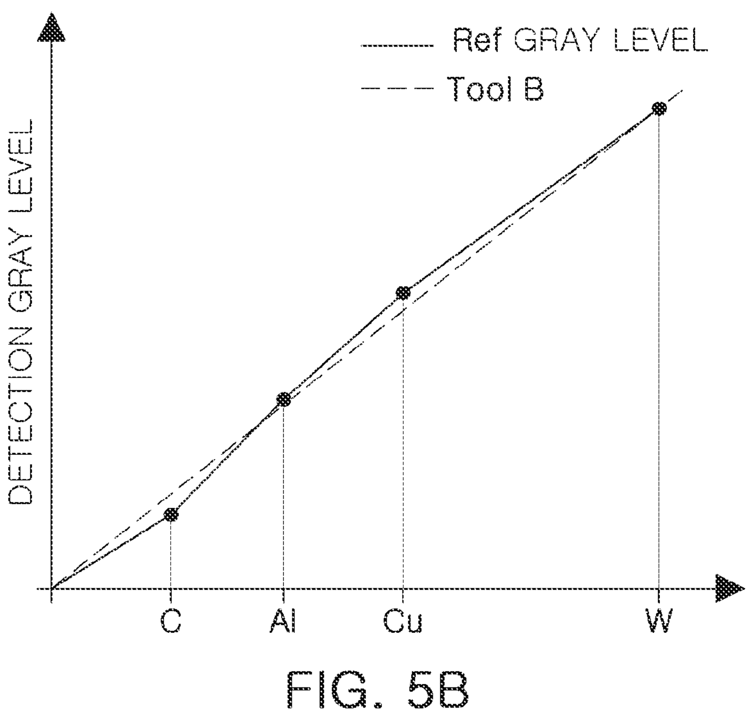

FIGS. 5A and 5B are views exemplarily illustrating states before and after calibrating a gray level according to an example embodiment of the present disclosure.

As illustrated in FIG. 5A, the gray levels of the detection signals for various materials (C, Al, Cu and W) of the test sample 115 in Tool B are different from reference gray levels before calibrating the gray level of the detector 150. In an example embodiment, the reference gray levels may be acquired through an artificial neural network. After calibrating the gray level of the detector 150, the gray levels for the various materials (C, Al, Cu and W) of the test sample 115 are calibrated similarly to the reference gray levels, as illustrated in FIG. 5B.

Figure 6:
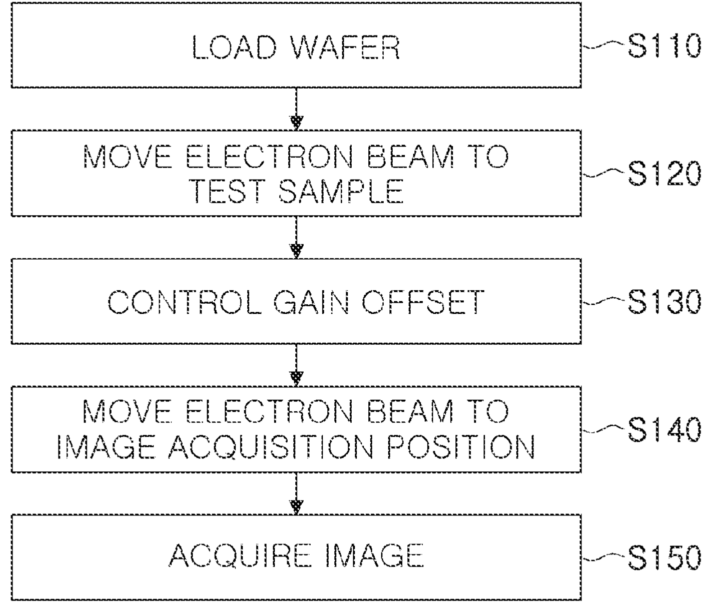
FIG. 6 is a view exemplarily illustrating an operating method of a wafer measurement apparatus according to an example embodiment of the present disclosure.

FIG. 6 is a view exemplarily illustrating an operating method of a wafer measurement apparatus 10 according to an example embodiment of the present disclosure.

Referring to FIGS. 1 to 6, the wafer measurement apparatus 10 may be a coupling detection apparatus, which may operate as follows.

For pattern inspection, the wafer W may be loaded onto a stage 110 (S110). The electronic-optical system 100 moves an electron beam to a test sample 115 (S120). The gray levels may be acquired for each of the materials (e.g., C, Al, Cu and W) included in the test sample 115, compared with a reference gray level, and then the gain offset of the detector 150 may be controlled according to the comparison results (S130). As described above, after calibrating the gray level of the detector 150, the electronic-optical system 100 may move the electron beam to an image acquisition position on the wafer W (S140). Subsequently, the image processing device 200 may acquire an image of the image acquisition position using the raw signal acquired from the detector 150 (S150).

In an example embodiment, the gray level of the test detection signal may be acquired, the gray level may be compared with the reference gray level, and the gain offset may be calibrated according to the comparison results. In an example embodiment, a delta value corresponding to the comparison results may be output to the image processing device 200. In an example embodiment, the gray level of the raw signal acquired subsequently using the delta value may be post-calibrated in the image processing device 200. In an example embodiment, the raw signal corresponding to the detection signal may be acquired from the detector 150, and the image processing device 200 may convert an image using the raw signal.

After the gray level is primarily calibrated in the electronic-optical system 100, the gray level may be secondarily calibrated in the image processing device 200.

Figure 7A:
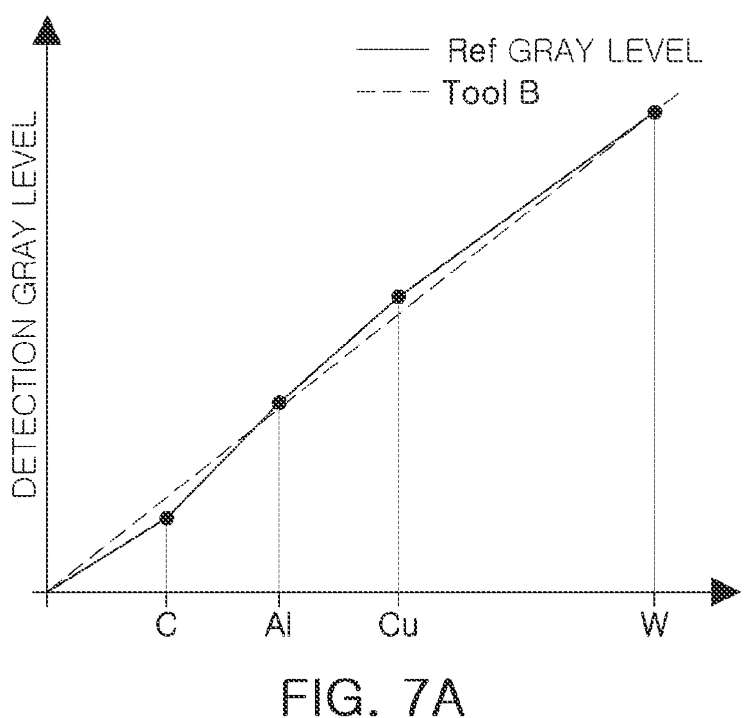
FIG. 7A is a view illustrating a calibration of the gray level in an electronic-optical system according to an example embodiment of the present disclosure.
Figure 7B:
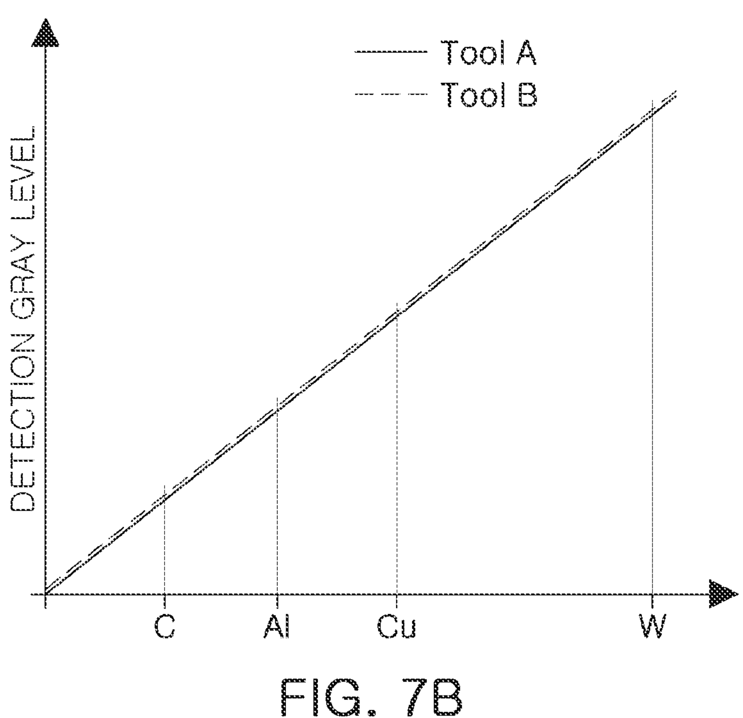
FIG. 7B is a view illustrating an additional calibration of the gray level in the image processing device according to an example embodiment of the present disclosure.

FIG. 7A is a view illustrating a calibration of the gray level in the electronic-optical system 100 according to an example embodiment. FIG. 7B is a view illustrating an additional calibration of the gray level in the image processing device 200 according to an example embodiment.

The electronic-optical system 100 may adjust the gray level of the raw signal by adjusting an offset of the detector 150 based on the reference gray level. As illustrated in FIG. 7A, even after adjusting the gray level of the detector 150, a difference may exist between the reference gray level and the detection gray level.

As illustrated in FIG. 7B, the image processing device 200 may additionally software-calibrate the gray level adjusted in the electronic-optical system 100. In the instant case, the difference in the gray levels between Tool A and Tool B may be almost removed. For example, the reference gray level and a delta value generated after calibration may be stored, and the delta value may be used to perform post-calibration for the gray level value on an image measured in subsequent measurement. Accordingly, a final image may be acquired.

According to embodiments of the present disclosure, the gray level may be corrected and calibrated in a post-processing image stage when measuring the wafer.

Figure 8:
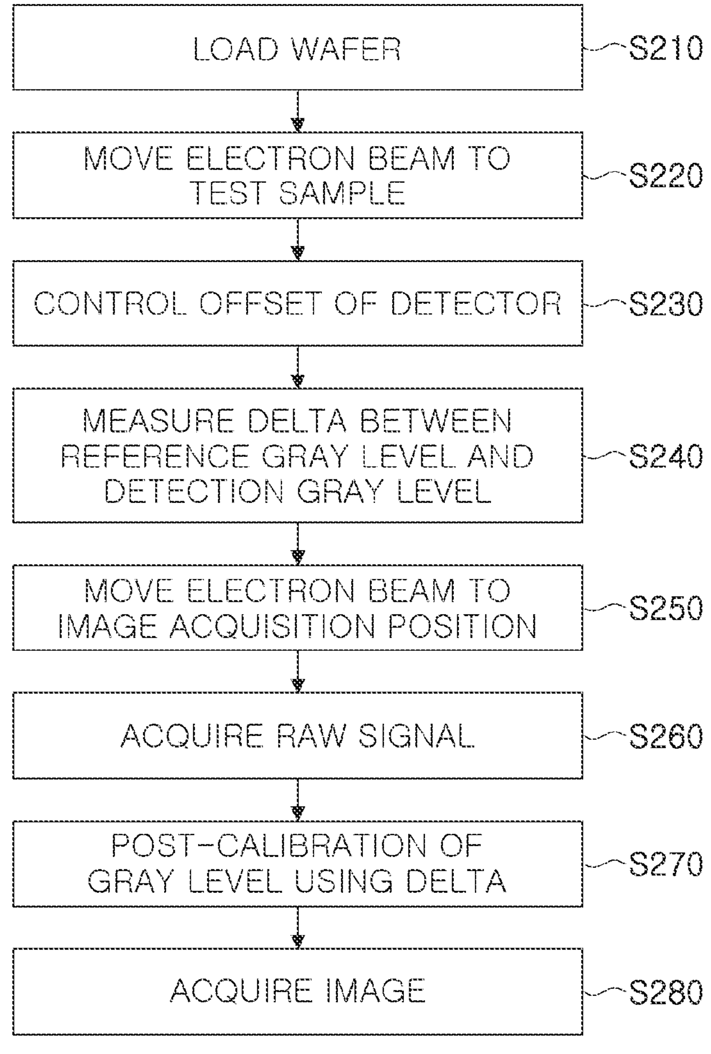
FIG. 8 is a flowchart exemplarily illustrating an operating method of a wafer measurement apparatus according to an example embodiment of the present disclosure.

FIG. 8 is a flowchart exemplarily illustrating an operating method of a wafer measurement apparatus 10 according to an example embodiment of the present disclosure.

Referring to FIGS. 1 to 8, the wafer measurement apparatus may be a coupling detection apparatus 10 which may operate as follows. For pattern inspection, the wafer W may be loaded in the stage 110 (S210). The electronic-optical system 100 moves the electron beam to the test sample 115 (S220). The gray level may be acquired from each of the materials included in the test sample 115 (e.g., C, Al, Cu and W), the acquired gray level may be compared with the reference gray level, and the gain offset of the detector 150 may be controlled according to the comparison results (S230). In the instant case, a delta value between the detection gray level and the reference gray level may be measured (S240). The measured delta value may be transmitted to the image processing device 200 for future calibration. The image processing device 200 may store the delta value between the reference gray level and the detection gray level.

Then, the electronic-optical system 100 may move the electron beam to an image acquisition position on the wafer W (S250). Then, the image processing device 200 may acquire the raw signal from the detector 150 (S260). In the instant case, the image processing device 200 may post-calibrate the gray level of the raw signal acquired from the detector 150 using the stored delta value (S270). The image processing device 200 may acquire an image of an image acquisition position using the calibrated gray level (S280).

Figure 9:
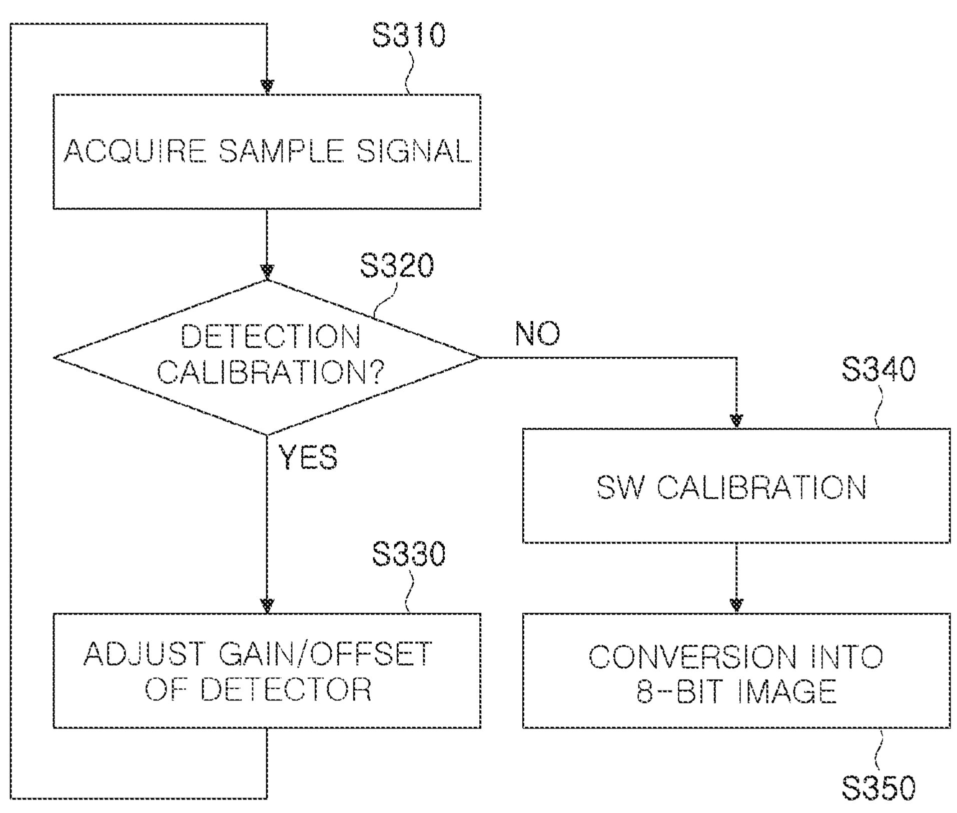
FIG. 9 is a flowchart exemplarily illustrating an image acquisition process of a wafer measurement apparatus according to an example embodiment of the present disclosure.

FIG. 9 is a flowchart exemplarily illustrating an image acquisition process of the wafer measurement apparatus 10 according to an example embodiment of the present disclosure.

Referring to FIGS. 1 to 9, an image acquisition process of the wafer measurement apparatus 10 may be performed as follows.

The electronic-optical system 100 may acquire a signal of the test sample 115 (S310). Then, it may be determined whether detection adjustment is to be performed by comparing the acquired signal with the reference signal (S320). When the detection adjustment is to be performed, the gain/offset of the detector 150 may be calibrated (S330). Then, the process may return to operation S310. On the other hand, when the detection adjustment is not to be performed, the raw signal of the wafer W may be acquired, and the image processing device 200 may software-adjust the acquired raw signal (S340). For example, the post-calibration for the gray level may be performed. Then, the image processing device 200 may convert the adjusted signal into an 8-bit image signal (S350).

In an example embodiment, it may be determined whether the detection adjustment is to be performed by comparing the gray level of the sample signal with the reference gray level. In an example embodiment, the image processing device 200 may receive a delta value corresponding to a difference between the gray level corresponding to the test sample from the detector 150 and the reference gray level, and store the received delta value. In an example embodiment, the image processing device 200 may post-calibrate the gray level of the raw signal using the stored delta value.

The device described above may be implemented as, for example, a hardware component, a software component, or a combination of both hardware and software components. For example, the devices and components described herein may be implemented using one or more general-purpose computers or special-purpose computers, such as a processor, a controller, an arithmetic logic unit (ALU), a digital signal processor, a microcomputer, a field programmable gate array (FPGA), a microprocessor, or any other device capable of executing and responding to instructions. The processing device may execute an operating system and one or more software applications running on the operating system. Furthermore, the processing device may access, store, manipulate, process, and generate data in response to the execution of the software. For the sake of clarity, one processing device may be described as being used, but it is to be understood that, according to example embodiments, the processing device may include a plurality of processing elements or a plurality of types of processing elements. For example, the processing device may include a plurality of processors or one processor and one controller. Furthermore, the processing devices may also have other processing configurations such as, for example, a parallel processor.

Software may include a computer program, code, instruction, or any combination thereof, and may configure a processing device to operate as desired or command the processing device independently or collectively. The software and/or data may be embodied in any type of machine, components, physical devices, virtual equipment, or computer storage medium or device so that software and/or data can be interpreted by the processing unit or provided to the processing unit. The software may be distributed on a network-connected computer system and stored or executed in a distributed manner. The software and data may be stored on one or more computer-readable recording media.

Figure 10A:
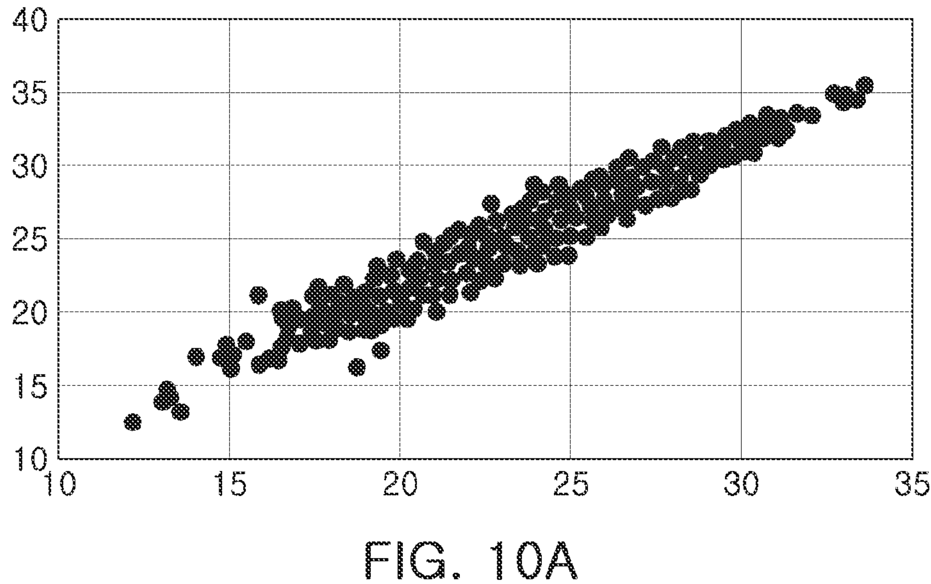
FIG. 10A is a view illustrating measurement of a Recess gray level according to a comparative example.
Figure 10B:
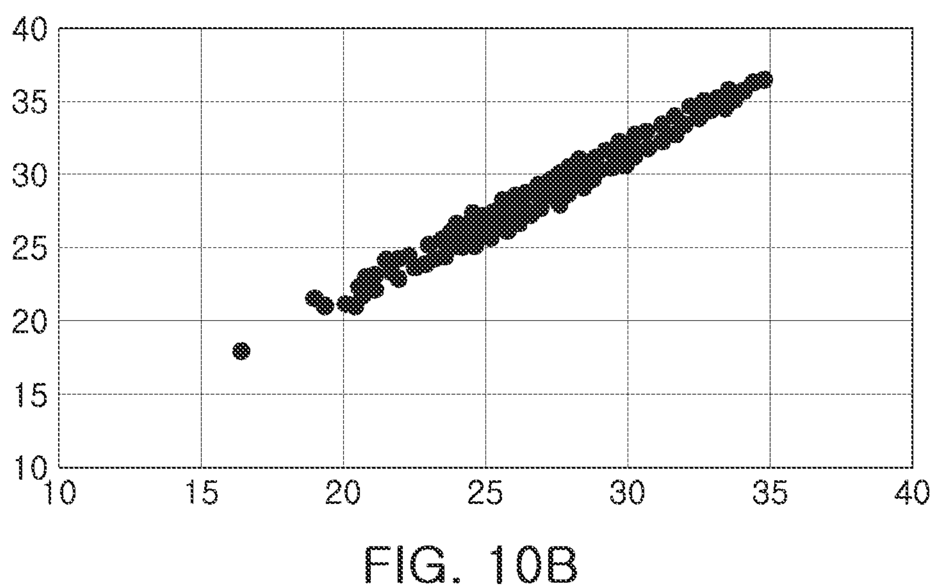
FIG. 10B is a view illustrating measurement of a Recess gray level according to an example embodiment of the present disclosure.

FIG. 10A is a view illustrating measurement of a Recess gray level according to a comparative example. FIG. 10B is a view illustrating measurement of a Recess gray level according to an embodiment of the present disclosure.

Referring to FIG. 10B, in a wafer measurement apparatus according to an example embodiment of the present disclosure, a deviation of the measurement results between Tool A and Tool B is less than that of the wafer measurement apparatus according to a comparative example illustrated in FIG. 10A.

When the wafer measurement apparatus 10 according to the example embodiment of the present disclosure matches the raw signal of the detector 150, a $R^2$ value generated from the measurement between measurement tools may be improved, thereby performing feedback on an accurate value to the process.

A typical wafer measurement apparatus may include a detector that collects electrons generated from a sample in a secondary electron microscopy (SEM) and a system for converting the electrons into an image. A general SEM structure does not directly use a raw signal, instead using an 8-bit converted image for Critical Dimension (CD) measurement or inspection. Although there may be a desire to directly use the raw signal, it may be difficult to do so because the tool may not manage the corresponding signal. On the other hand, the wafer measurement apparatus according to example embodiments of the present disclosure may achieve consistent gray levels between tools using a well-known material yield. The wafer measurement apparatus according to example embodiments of the present disclosure may fabricate a special sample using a yield with material-dependent differences and calibrate the detector based on the gray level value generated during that process. Furthermore, the wafer measurement apparatus according to example embodiments of the present disclosure may overcome differences generated when measuring raw signals between tools by calibrating the data in greater detail using an image processing system.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A wafer measurement apparatus, comprising:

an electronic-optical system configured to irradiate a wafer with an electron beam and acquire a raw signal by detecting electrons emitted by the wafer; and an image processing device configured to convert the raw signal acquired by the electronic-optical system into image data, wherein the electronic-optical system comprises a detector configured to acquire the raw signal, and the detector calibrates a gain offset using a difference in electron emission yields of different materials.

2. The wafer measurement apparatus of claim 1, wherein the detector receives gray levels by acquiring electrons emitted by a test sample having the different materials, and the gain offset is calibrated using each of the gray levels of the different materials.

3. The wafer measurement apparatus of claim 2, wherein the different materials comprise carbon (C), aluminum (Al), copper (Cu), or tungsten (W).

4. The wafer measurement apparatus of claim 2, wherein each of the gray levels is calibrated by comparing each of the gray levels with a reference gray level.

5. The wafer measurement apparatus of claim 1, wherein the electronic-optical irradiates the wafer with the electron beam after the detector calibrates the gain offset, and acquires the raw signal emitted by the wafer.

6. The wafer measurement apparatus of claim 1, wherein the electronic-optical system detects a gray level of the different materials, compares the detected gray levels with a reference gray level, and transmits a delta value of a difference between the gray levels according to a comparison result to the image processing device.

7. The wafer measurement apparatus of claim 6, wherein the image processing device additionally calibrates a gray level of the raw signal measured in a subsequent measurement using the delta value.

8. The wafer measurement apparatus of claim 1, wherein the image processing device converts the raw signal into an 8-bit image signal.

9. The wafer measurement apparatus of claim 1, wherein the electronic-optical system comprises:

a stage configured to support the wafer and having a test sample having the different materials;

an electron gun configured to generate the electron beam;

a lens system configured to control a direction and a width of the electron beam; and an energy filter configured to filter the electrons emitted by the wafer.

10. The wafer measurement apparatus of claim 1, wherein the image processing device detects a defect pattern by storing the raw signal, converting the raw signal into an image, and comparing the converted image with a design image of a pattern.

11. An operating method of a wafer measurement apparatus, the method comprising:

loading a wafer onto a stage;

moving an electron beam to a test sample comprising a plurality of materials;

controlling a gain offset of a detector using a gray level of a test detection signal emitted by the test sample;

moving the electron beam to an image acquisition position after controlling the gain offset of the detector; and acquiring an image using a detection signal emitted at the image acquisition position, wherein the gain offset is controlled based on a difference in electron emission yields of the plurality of materials.

12. The operating method of claim 11, wherein controlling the gain offset comprises:

acquiring the gray level of the test detection signal;

comparing the gray level with a reference gray level; and calibrating the gain offset according to the comparison result.

13. The operating method of claim 12, further comprising:

outputting a delta value corresponding to the comparison result to an image processing device.

14. The operating method of claim 13, further comprising:

post-calibrating a gray level of a raw signal subsequently acquired using the delta value in the image processing device.

15. The operating method of claim 11, wherein the acquiring the image comprises:

acquiring a raw signal corresponding to the detection signal from the detector; and converting the raw signal into a converted image in an image processing device.

16. An operating method of a wafer measurement apparatus, the method comprising:

acquiring a sample signal emitted by a test sample;

determining whether detection calibration of a detector is to be performed using the sample signal;

adjusting a gain offset of the detector when the detection calibration is to be performed;

post-calibrating a gray level of a raw signal acquired at a predetermined position of a wafer when the detection calibration is not to be performed; and converting the raw signal into an 8-bit image using the calibrated gray level, wherein the gain offset is adjusted based on a difference in electron emission yields of different materials.

17. The operating method of claim 16, wherein determining whether detection calibration of the detector is to be performed comprises:

comparing a gray level of the sample signal with a reference gray level.

18. The operating method of claim 16, wherein post-calibrating the gray level comprises:

receiving a delta value corresponding to a difference between a gray level corresponding to the test sample from the detector and a reference gray level; and storing the received delta value.

19. The operating method of claim 18, wherein post-calibrating the gray level further comprises:

calibrating the gray level of the raw signal using the stored delta value.

20. The operating method of claim 16, further comprises:

acquiring the raw signal at the predetermined position of the wafer.

* * * * *